United States Patent
Leonard

(10) Patent No.: US 10,343,581 B1
(45) Date of Patent: Jul. 9, 2019

(54) HOIST MECHANISM FOR A VEHICLE

(71) Applicant: Ralph L. Leonard, Charlotte, NC (US)

(72) Inventor: Ralph L. Leonard, Charlotte, NC (US)

( * ) Notice: Subject to any disclaimer, the term of this patent is extended or adjusted under 35 U.S.C. 154(b) by 0 days.

(21) Appl. No.: 15/924,585

(22) Filed: Mar. 19, 2018

(51) Int. Cl.
*B60P 1/54* (2006.01)
*B60R 9/042* (2006.01)
*B60P 3/10* (2006.01)
*B66D 1/60* (2006.01)
*B66C 23/36* (2006.01)

(52) U.S. Cl.
CPC ........... *B60P 1/5476* (2013.01); *B60P 1/5414* (2013.01); *B60P 3/1016* (2013.01); *B60R 9/042* (2013.01); *B66C 23/36* (2013.01); *B66D 1/60* (2013.01)

(58) Field of Classification Search
CPC ..... B60P 1/5476; B60P 1/5414; B60P 1/5442; B60P 1/5471; B60P 1/5485; B60P 3/1016; B60R 9/048; B60R 9/04; B60R 9/042
See application file for complete search history.

(56) References Cited

U.S. PATENT DOCUMENTS

| | | | |
|---|---|---|---|
| 2,967,635 A | 1/1961 | Barnett | |
| 3,139,203 A | 6/1964 | Borger | |
| 3,215,294 A * | 11/1965 | Salamin | B60R 9/042 224/310 |
| 3,608,759 A | 9/1971 | Arvada et al. | |
| 3,927,779 A | 12/1975 | Johnson | |
| 3,952,893 A | 4/1976 | Kolesar | |
| 4,134,509 A | 1/1979 | Clement | |
| 4,139,110 A | 2/1979 | Roberts | |
| 4,272,218 A | 6/1981 | Carter | |
| 5,360,151 A | 11/1994 | Fine | |
| 5,460,472 A | 10/1995 | Bamber | |
| 5,709,521 A * | 1/1998 | Glass | B60R 9/042 224/310 |
| 5,827,036 A | 10/1998 | Steffes et al. | |
| 5,904,463 A | 5/1999 | Christensen | |
| 6,634,529 B2 | 10/2003 | Choiniere et al. | |
| 9,290,130 B2 * | 3/2016 | Buller | B60R 9/042 |
| 9,346,409 B2 * | 5/2016 | Pfaeffli | B60R 9/045 |
| 9,758,106 B2 * | 9/2017 | Zimmer | B60R 9/042 |
| 10,040,402 B1 * | 8/2018 | Brusselback | B60R 9/042 |
| 10,046,711 B2 * | 8/2018 | Zimmer | B60R 9/042 |
| 10,246,025 B1 * | 4/2019 | Knigge | B60R 9/042 |
| 2007/0007316 A1 * | 1/2007 | Witczak | B60R 9/042 224/310 |

(Continued)

*Primary Examiner* — Kaitlin S Joerger
(74) *Attorney, Agent, or Firm* — Hammer & Associates, P.C.

(57) ABSTRACT

A hoist mechanism for loading an object onto a vehicle is disclosed. The vehicle may include an affixed roof rack having at least two transverse bars. The hoist mechanism includes: a horizontal bar and a vertical lift mechanism. The horizontal bar is affixable to a transverse bar, is hollow, and has an open end. The vertical lift mechanism is removably mate-able with the horizontal bar and includes: a vertical mast; a boom joined to the upper end; an insert bar fits into the open end, located away from the boom, and is releasably affixed in the horizontal bar; and a lift wire with a grapnel at a distal end, the lift wire running between the end of the boom and down the vertical mast. Wherein after the horizontal bar and insert bar are is affixed to the vehicle, the object is attached to the grapnel and hoisted onto the vehicle.

20 Claims, 8 Drawing Sheets

(56) References Cited

U.S. PATENT DOCUMENTS

| | | | |
|---|---|---|---|
| 2008/0035688 A1* | 2/2008 | Malone | B60R 9/042 224/310 |
| 2011/0024472 A1* | 2/2011 | Thompson | B60R 9/042 224/500 |
| 2018/0162288 A1* | 6/2018 | Sautter | B60P 1/00 |
| 2018/0264983 A1* | 9/2018 | Lin | B60R 9/04 |
| 2018/0281692 A1* | 10/2018 | Fifield | B60R 9/10 |

* cited by examiner

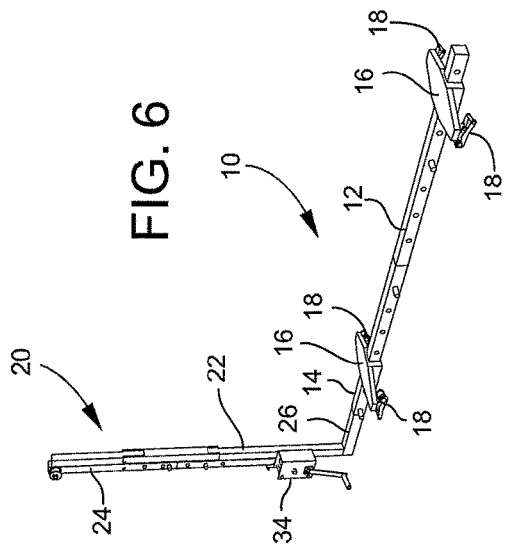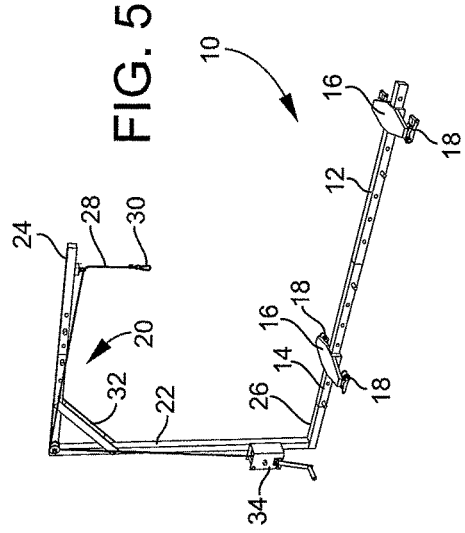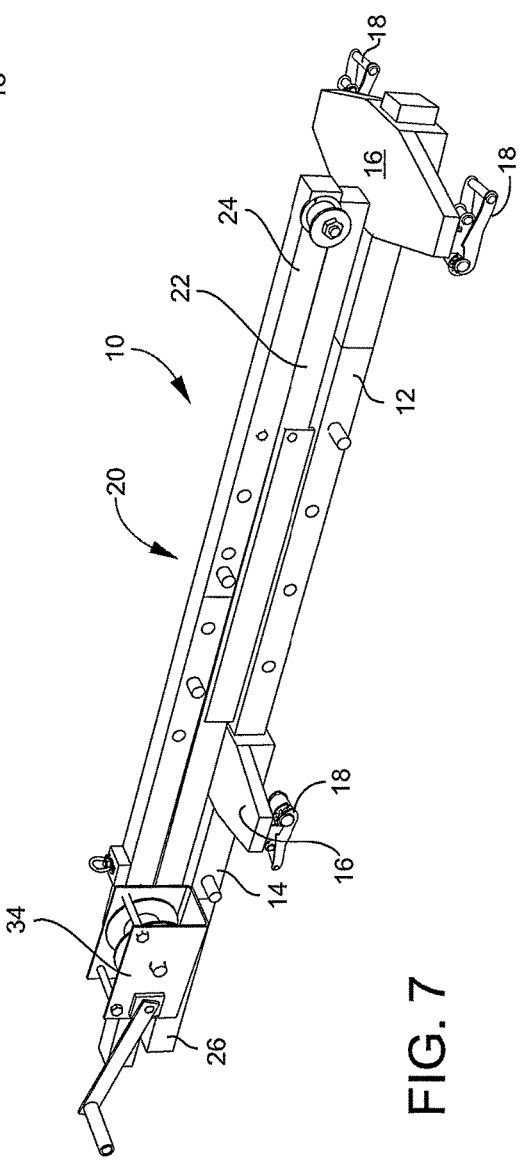

US 10,343,581 B1

HOIST MECHANISM FOR A VEHICLE

FIELD OF THE INVENTION

The invention is directed to a hoist mechanism for a vehicle, more particularly to a hoist mechanism for a vehicle with a roof rack.

BACKGROUND OF THE INVENTION

Outdoor recreational activities, for example, kayaking, canoeing, and biking, often require that a recreational vehicle, for example, a kayak, a canoe, or a bicycle (bike), be transported to a remote location. Such transport is typically in a vehicle, for example, a car or a van. Many such vehicles may have built-in roof racks.

It can be difficult for a single individual to lift the recreational vehicle onto the transport vehicle.

Accordingly, there is a need for a vehicle hoist mechanism for lifting an object (or recreational vehicle) onto the vehicle (or transport vehicle).

SUMMARY OF THE INVENTION

A hoist mechanism for loading an object onto a vehicle is disclosed. The vehicle may have an affixed roof rack. The roof rack may have at least two transverse bars. The hoist mechanism includes: a horizontal bar and a vertical lift mechanism. The horizontal bar has two end portions. Each end portion is adapted to be affixed to one transverse bar, so the horizontal bar is affixed to the vehicle via the roof rack. The horizontal bar is hollow and open at, at least, one end. The vertical lift mechanism is removably mate-able with the horizontal bar. The vertical lift mechanism has: a vertical mast with an upper end portion and a lower end portion; a boom joined to the upper end portion of the vertical mast and having a free end; an insert bar adapted to fit into the hollow end of the horizontal bar, is located away from the boom, and is releasably affixed in the horizontal bar; and a lift wire with a grapnel at a distal end of the wire, the lift wire running between the free end of the boom and down the vertical mast. Wherein after the horizontal bar is affixed to the transverse bars of the vehicle and the insert bar is affixed into the horizontal bar, the object is attached to the grapnel and hoisted onto the vehicle via the lift wire.

DESCRIPTION OF THE DRAWINGS

For the purpose of illustrating the invention, there is shown in the drawings a form that is presently preferred; it being understood, however, that this invention is not limited to the precise arrangements and instrumentalities shown.

FIG. 5 is an illustration of the embodiment of the hoist mechanism assembled and erected for hoisting.

FIG. 6 is an illustration of the embodiment of the hoist mechanism with a boom collapsed.

FIG. 7 is an illustration of the embodiment of the hoist mechanism with the boom and the vertical mast collapsed.

DESCRIPTION OF THE INVENTION

Figure 1:
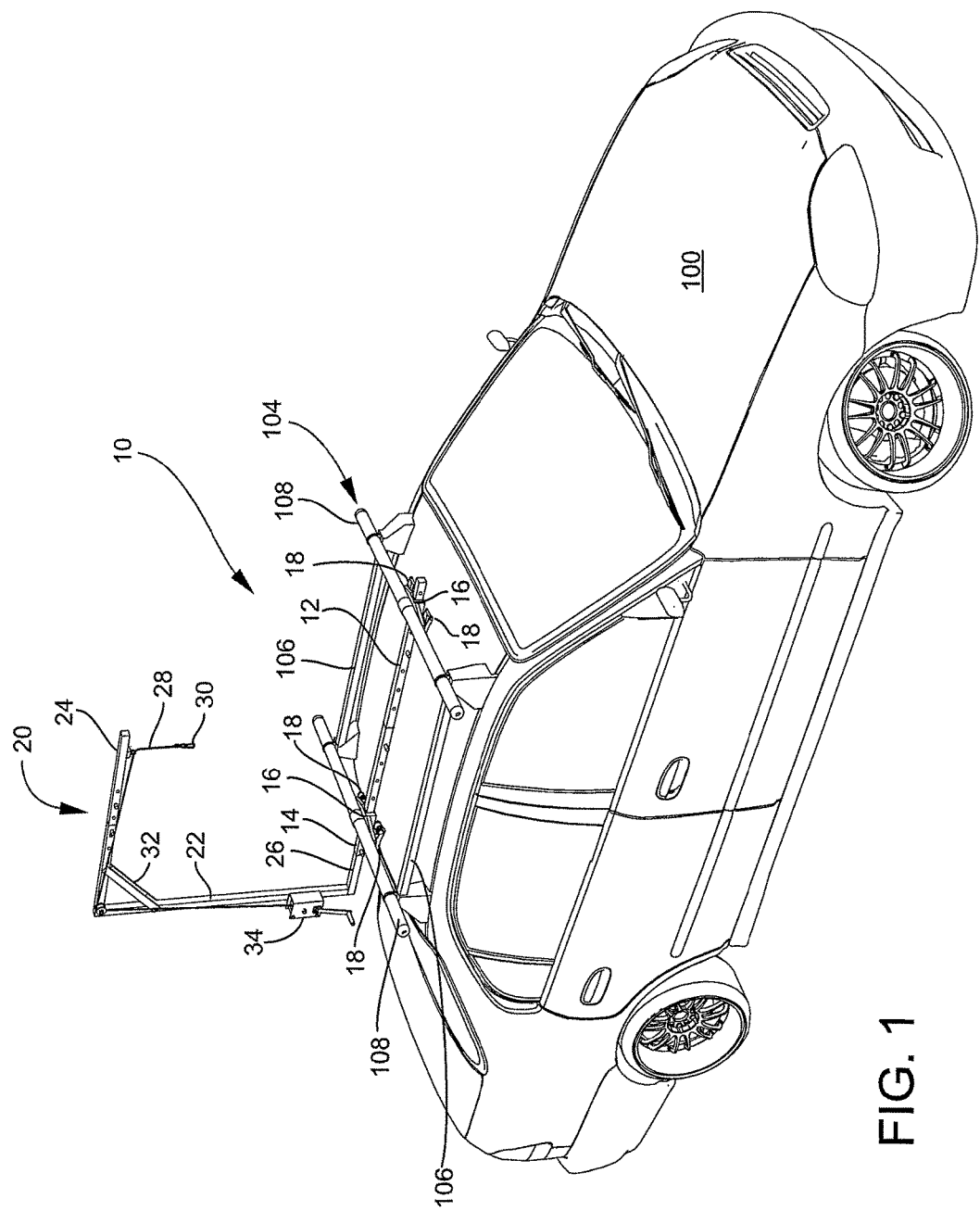
FIG. 1 is an isometric, environmental view of a first embodiment of the hoist mechanism attached to a first vehicle.
Figure 8:
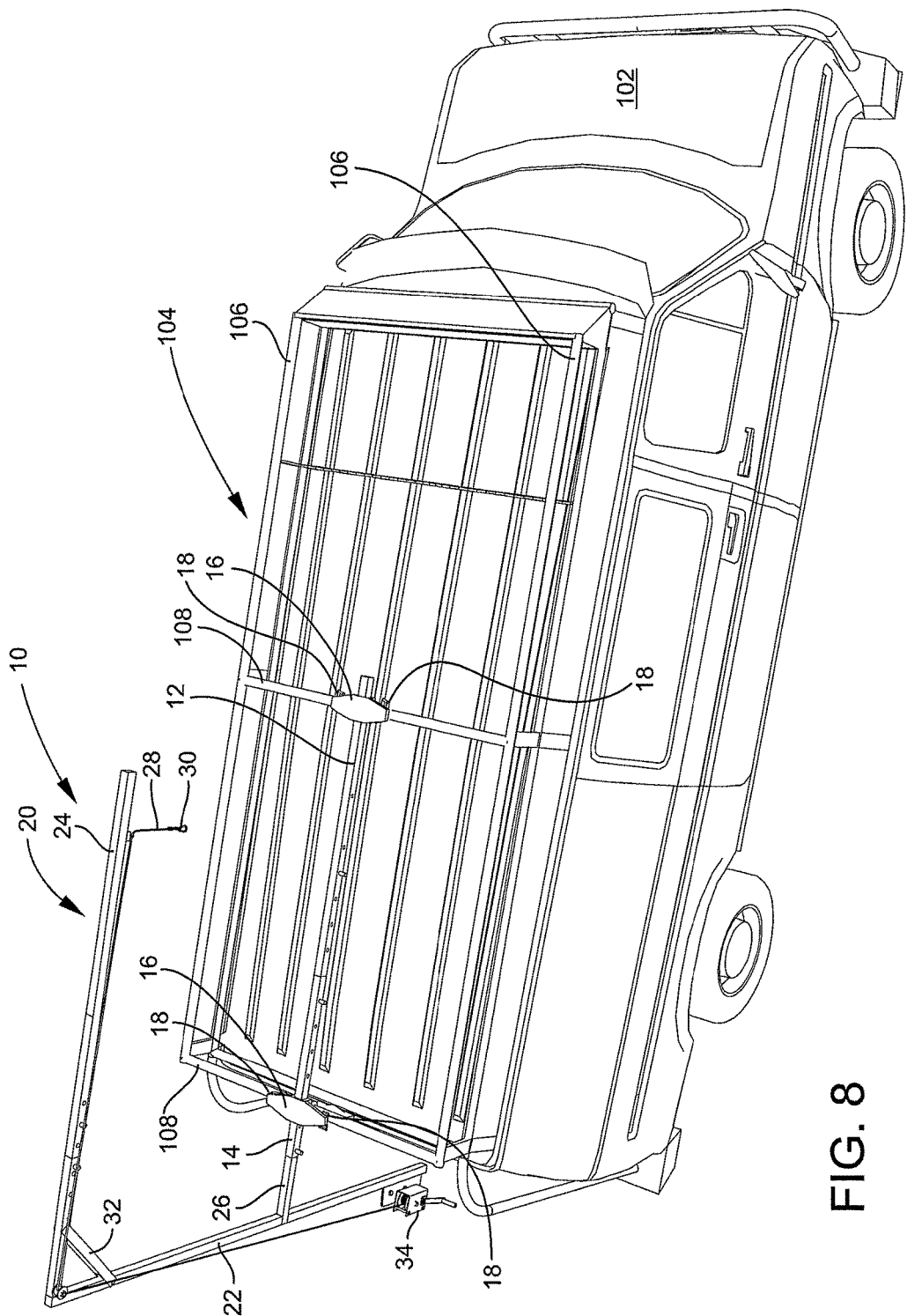
FIG. 8 is an illustration of a second embodiment of the hoist mechanism attached to a second vehicle.

Referring to the drawings, wherein like numerals indicate like elements, there is shown in FIG. 1 a first embodiment of the hoist mechanism 10 and in FIG. 8 a second embodiment of the hoist mechanism 10. Hoist mechanism 10 may be removably mounted on any vehicle, in FIG. 1 a sedan 100 is shown, and in FIG. 8 a van 102 is shown.

The vehicle includes a roof rack 104. Roof rack 104 may be affixed to the vehicle or removably affixed to the vehicle. In general, the roof rack 104 includes a pair of longitudinal (and parallel) rails 106 and a pair of transverse (and parallel) rails 108. Typically, the transverse rails 108 may be moved along longitudinal rails 106.

Any telescoping, folding, or pivoting movements, discussed herein, may be secured in any conventional fashion, for example with detents or pins.

Figure 2:
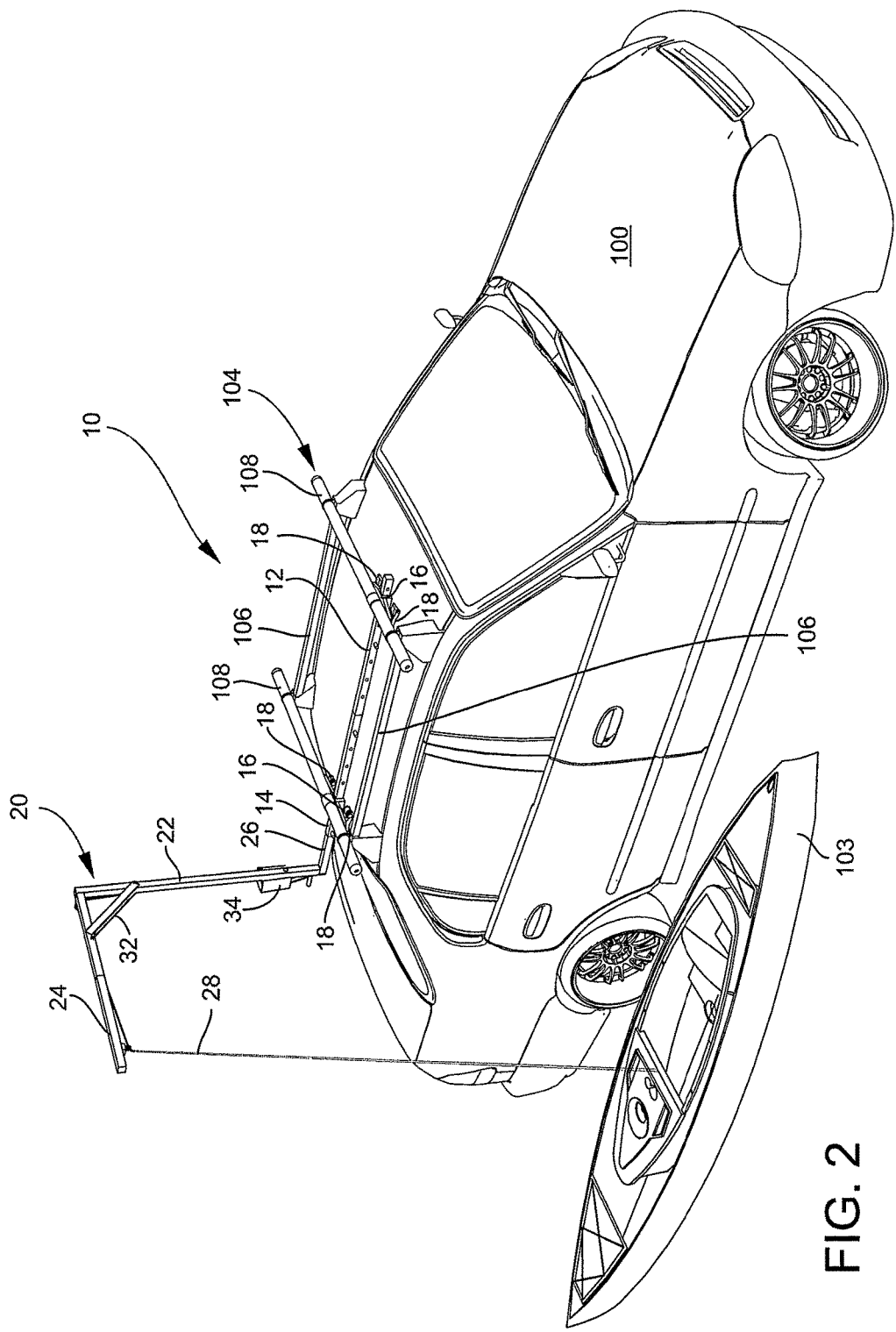
FIG. 2 is an illustration of the hoist mechanism of FIG. 1 prior to lifting an object.

The hoist mechanism 10 may be used to lift or lower an object 103 from a vehicle, compare FIGS. 2 and 3, as will be discussed in greater detail below. The object 103 may be any recreational vehicle, such as, for example, a kayak, a canoe, or a bike, and/or a cargo box.

The hoist mechanism 10, for example see FIGS. 1, 4, and 9, generally includes: a horizontal bar 12 removably attached to the roof rack 104; and a vertical lift mechanism 20, both discussed in greater detail below.

The horizontal bar 12 may be removably attached to the transverse rails 108 of roof rack 104. Horizontal bar 12 may be positioned below (See FIG. 1) or above (see FIG. 9) transverse rails 108. Each end of the horizontal bar 12 may be removably attached, in any conventional fashion, to one transverse rail 108. The horizontal bar 12 may be slidable along the transverse rails 108 (compare FIGS. 1 and 2). After positioning of the horizontal bar 12 on the transverse rails 108, the horizontal bar 12 must be fixed in place, in any conventional manner, on the transverse rail 108 for use. In one embodiment, strap ratchets 18 on horizontal bar 12 may be sued to secure bar 12 to rail 18.

Figure 4:
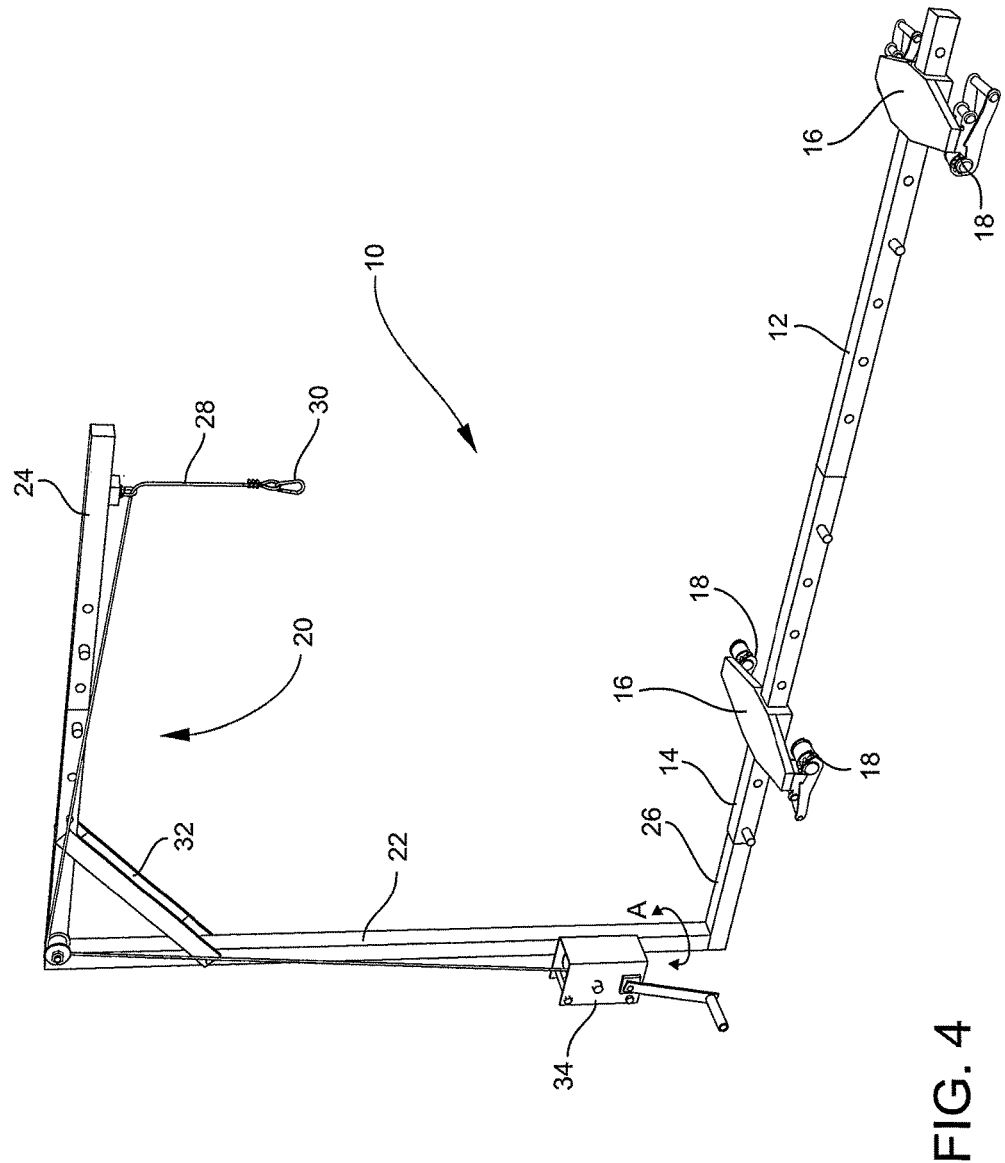
FIG. 4 is a illustration of the embodiment of the hoist mechanism shown in FIGS. 1-3.

The horizontal bar 12, see FIG. 4, may be hollow or partially solid (with any cross section—circular, oval square, rectangular, and/or triangular), and has, at least, one open end 14. Moreover, horizontal bar may be telescoping for length adjustment between the transverse rails 108. Stubs (or wings) 16 may be affixed to or slidably affixed on, the horizontal bar 12 and are used to prevent the hoist mechanism 10 for tipping when affixed to the roof rack 104.

Figure 10:
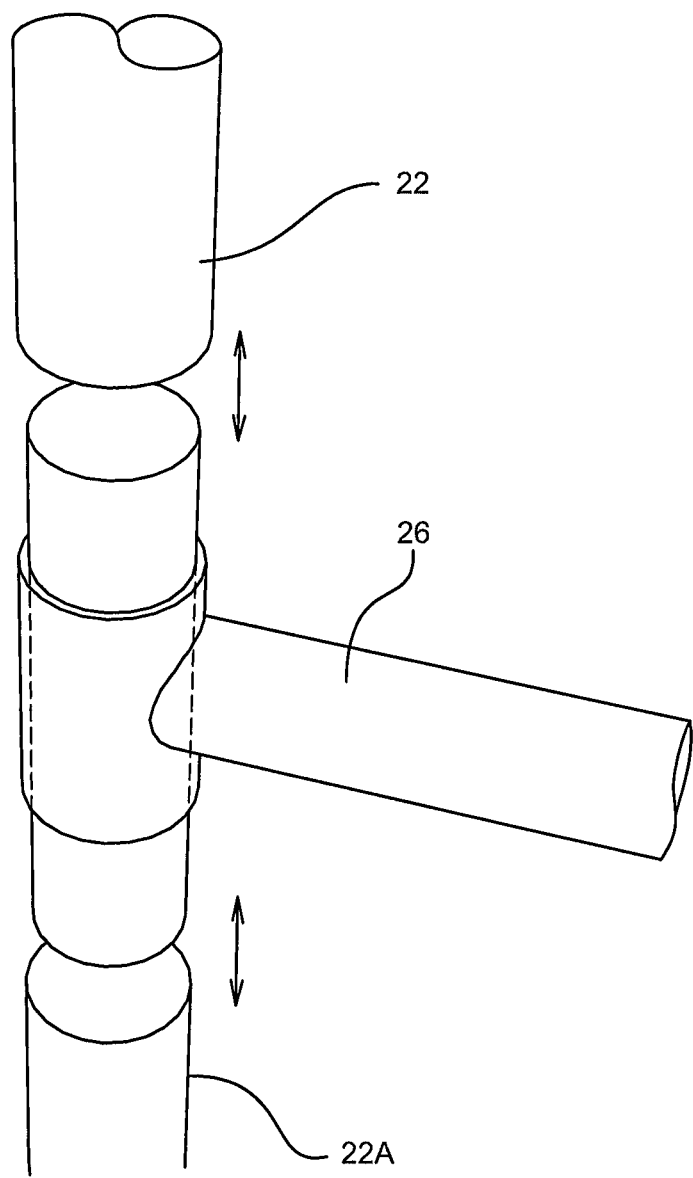
FIG. 10 is an illustration of an embodiment of the a joint used in the embodiment shown in FIGS. 8-9.

The vertical lift mechanism 20, for example see FIG. 4, may generally include: a vertical mast 22, a boom 24 joined at an upper end of the mast 22; an insert bar 26 for insertion into and being removably affixed in the horizontal bar 12, and a lift wire 28, having a grapnel 30 at one end thereof, runs from the free end of the boom 24 and down the mast 22. The vertical lift mechanism may be located at the rear of the vehicle (shown in FIG. 1) or the front of the vehicle (not shown). In one embodiment, a joint (see FIG. 10) may be used to join mast 22 to a lower mast 22A and insert bar 26.

Vertical mast 22 may be telescoping and/or include multiple sections (e.g., see FIG. 10) for example height adjustment. In the second embodiment, for example see FIGS. 8 and 9, the vertical mast 22 may extend below the insert bar 26. The vertical mast 22 may rotate, with respect to insert bar 26, as indicated by arrow A. Moreover, the lowest most end of that mast may include a step (not shown).

Boom 24, when in use, generally extends away from the vertical mast 22. Boom 24 may rotates with vertical mast 22 (compare FIGS. 1 and 2). Boom 24 may be telescoping (e.g., for length adjustment) and/or foldable (e.g., for storage). Boom 24 may be collapsible (compare FIGS. 5-7).

Support strut 32 may be interposed between mast 22 and boom 24 to increase the structural strength of mechanism 10. Strut 32 may be foldably and/or removably connected to the mast 22 and/or boom 24.

Figure 3:
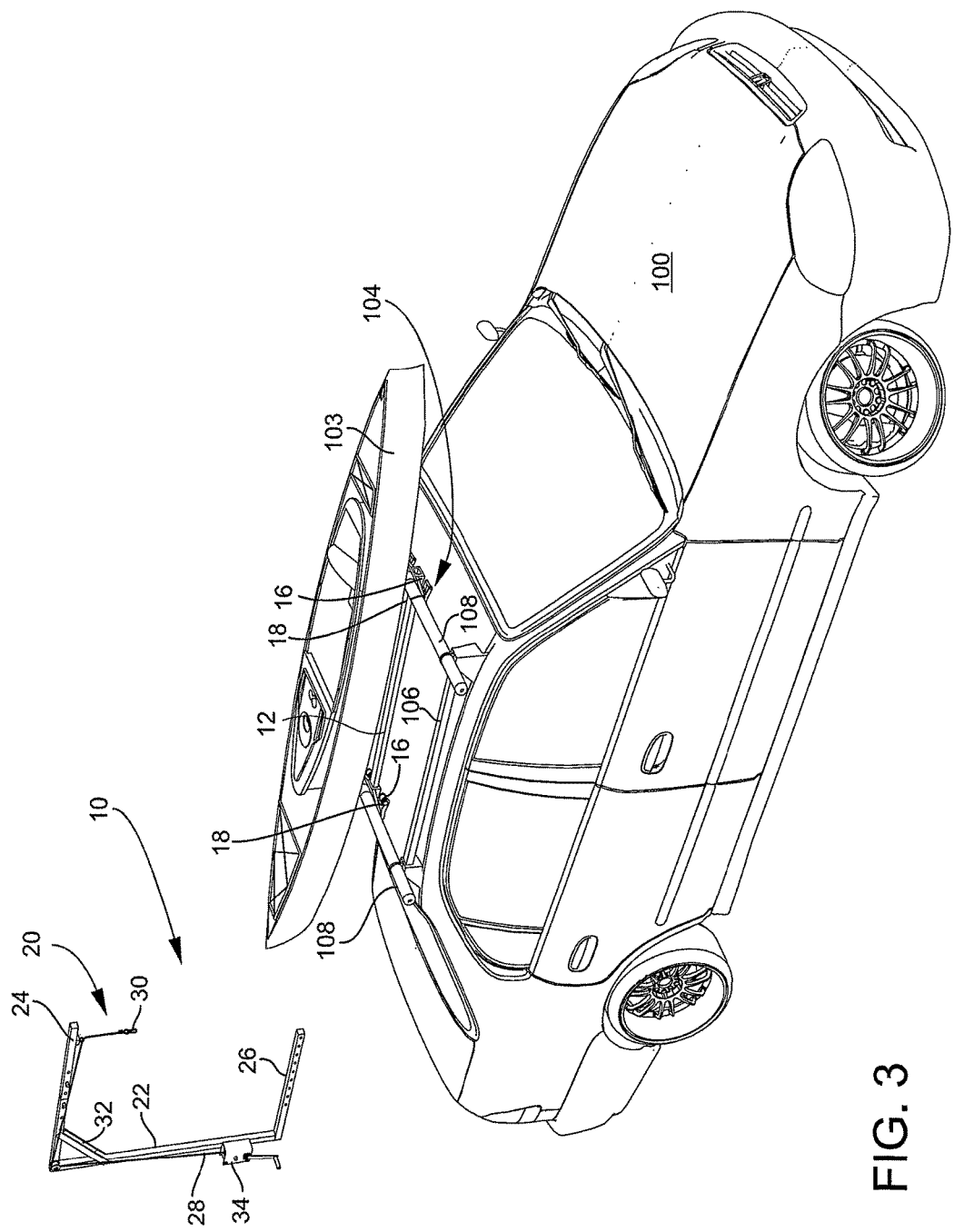
FIG. 3 is an illustration showing the object attached to the vehicle and a portion of the hoist mechanism removed.

Insert bar 26, see FIG. 3, generally extends away from the vertical mast 22. Insert bar 26 is adapted to fit into the open end 14 of the horizontal bar 12 and be removably affixed therein. When insert bar 26 is mated with horizontal bar 12, lateral sway of mechanism 10 is inhibited or eliminated. Mast 22 may be fixedly or pivotally (rotation in the horizontal plane (compare FIGS. 1 and 2) connected to inset bar 26 (note arrow A in FIG. 4). Insert bar 26 may be collapsible (compare FIGS. 5-7). Mast 22 may be slidably held in insert bar 26 (note FIGS. 8 and 9), i.e., the mast 22 may move up and/or down with relationship to the insert bar 26. A lock (not shown) may be used to secure the insert bar 26 in horizontal bar 12 to, for example, prevent theft.

Figure 9:
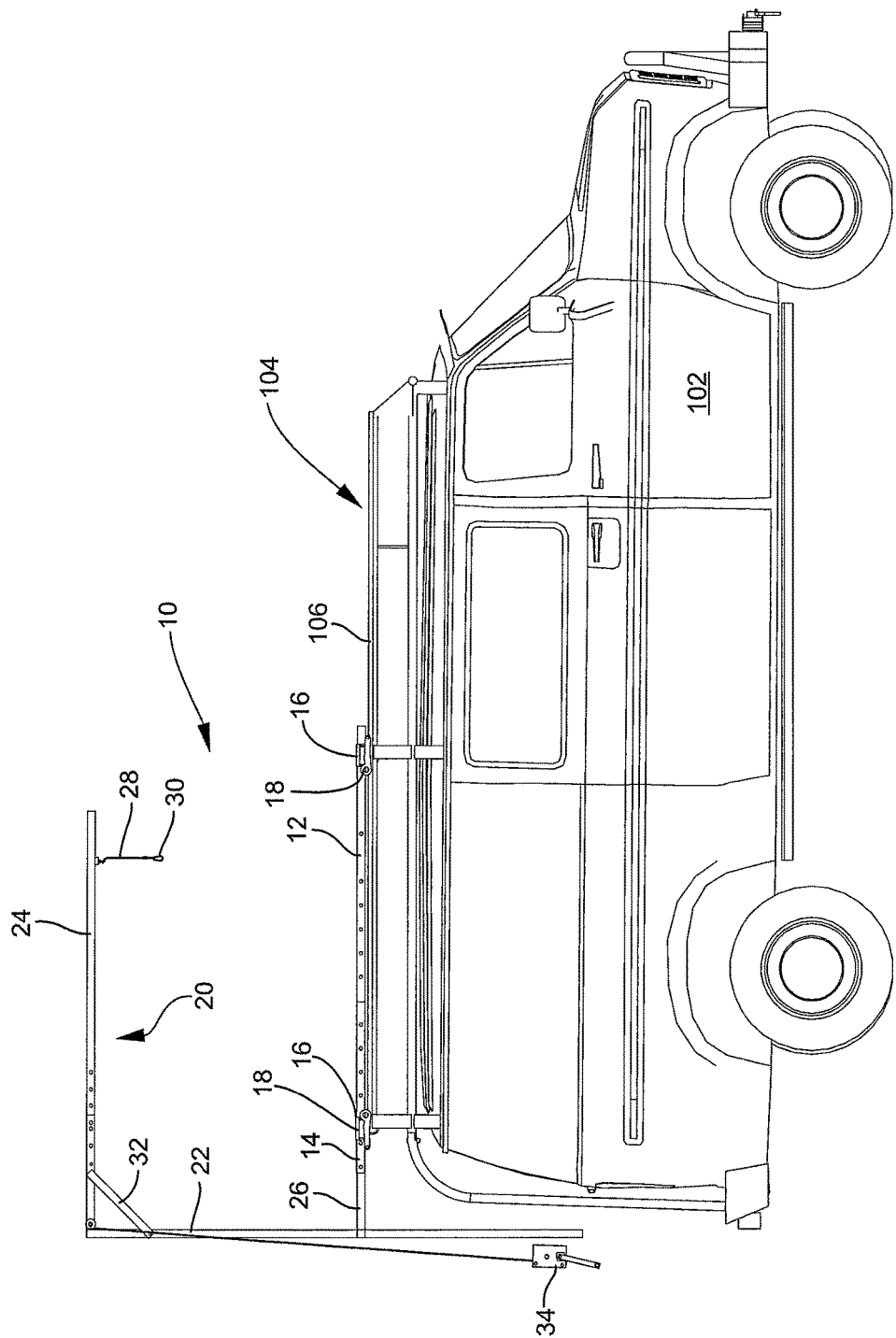
FIG. 9 is an illustration of the second embodiment of the hoist mechanism shown in FIG. 8.

The lift wire 28 extends from the free end of the boom 24 and down the mast 22 (note FIGS. 4 and 9). The distal end of wire 28 may terminate with a grapnel 30. The proximal end of wire 28 may used to lift or lower the object.

A winch 34 may be located at the proximal end of wire 28. Winch 34 may be any conventional winch. Such conventional winches include, but are not limited to: mechanical (or manually cranked) winches, and/or electrical winches (motorized with, for example, electrical power sourced from the vehicle or elsewhere), and/or an external, removable winch (e.g., geared, removable, power source or motor). The winch 34 may be movable along the mast (compare FIGS. 1 and 9).

In use, the horizontal bar 12 is placed on the transverse rails 108. The horizontal bar 12 may be slid along the transverse rails as desired before fixing the position of the horizontal bar 12 (compare FIGS. 1 and 2). The lift mechanism 20 is joined with (and fixed to) the horizontal bar 12 by inserting the insert bar 26 into the open end 14 of the horizontal bar 12 (note FIGS. 1 and 3). Boom 24 may be swung from an inboard position (note FIG. 1) to an outboard position (note FIG. 2). Lift wire 28 may be affixed to the recreational vehicle 103 (note FIG. 2). Vehicle 103 is hoisted onto the vehicle 100 or 102, (note FIG. 3). Vertical lift mechanism 20 may be removed from horizontal bar 12 (note FIG. 3) and the vehicle 103 is secured to the vehicle 100 or 102, in any conventional manner.

In storage, the hoist mechanism 10 may be collapsed, note FIGS. 4-7, for easy storage when not in use. The collapsed mechanism 10 may be stored on or off the vehicle.

The present invention may be embodied in other forms without departing from the spirit and the essential attributes thereof, and, accordingly, reference should be made to the appended claims, rather than to the foregoing specification, as indicating the scope of the invention.

I claim:

1. A hoist mechanism for loading an object onto a vehicle with a roof rack, the roof rack having at least two transverse bars, the hoist mechanism comprises:

a horizontal bar with two end portions, each end portion is adapted to be affixed to one transverse bar, so the horizontal bar is affixed to the vehicle via the roof rack, the horizontal bar is hollow and open at least one end;

a vertical lift mechanism removably mate-able with the horizontal bar, the vertical lift mechanism having
a vertical mast with an upper end portion and a lower end portion,
a boom joined to the upper end portion of the vertical mast and having a free end,
an insert bar adapted to fit into the hollow end of the horizontal bar, is located away from the boom, and is releasably affixed in the horizontal bar; and
a lift wire with a grapnel at a distal end of the wire, the lift wire running between the free end of the boom and down the vertical mast, wherein after the horizontal bar is affixed to the transverse bars of the vehicle and the insert bar is affixed into the horizontal bar, the object is attached to the grapnel and hoisted onto the vehicle via the lift wire.

2. The hoist mechanism of claim 1 wherein the horizontal bar includes support stubs where the horizontal bar is affixed to the transverse bars.

3. The hoist mechanism of claim 1 wherein the horizontal bar is adapted to telescope in length at a middle and/or an end of the horizontal bar.

4. The hoist mechanism of claim 1 wherein the boom pivots between a horizontal (or in use) position and a vertical (or storage) position.

5. The hoist mechanism of claim 1 wherein the boom swings between a outboard (or away from the top of the vehicle) position and a inboard (or over the vehicle) position.

6. The hoist mechanism of claim 1 further comprising a support strut between the boom and the vertical mast.

7. The hoist mechanism of claim 1 further comprising a winch operatively connected to the proximal end of the lift wire.

8. The hoist mechanism of claim 1 wherein the vertical mast extends below insert bar.

9. The hoist mechanism of claim 8 wherein the insert bar is movable along the vertical mast.

10. The hoist mechanism of claim 2 wherein the stubs further include tie-down mechanisms.

11. A hoist mechanism for loading an object onto a vehicle with an affixed roof rack, the roof rack having at least two transverse bars, the hoist mechanism comprises:

a horizontal bar with two end portions, each end portion is adapted to be affixed to one transverse bar, so the horizontal bar is affixed to the vehicle via the affixed roof rack, the horizontal bar is hollow and open at least one end;

a vertical lift mechanism removably mate-able with the horizontal bar, the vertical lift mechanism having
a vertical mast with an upper end portion and a lower end portion,
a boom joined to the upper end portion of the vertical mast and having a free end,
an insert bar adapted to fit into the hollow end of the horizontal bar, is located away from the boom, and is releasably affixed in the horizontal bar; and
a lift wire with a grapnel at a distal end of the wire, the lift wire running between the free end of the boom and down the vertical mast, wherein after the horizontal bar is affixed to the transverse bars of the vehicle and the insert bar is affixed into the horizontal bar, the object is attached to the grapnel and hoisted onto the vehicle via the lift wire.

12. The hoist mechanism of claim 11 wherein the horizontal bar includes support stubs where the horizontal bar is affixed to the transverse bars.

13. The hoist mechanism of claim 11 wherein the horizontal bar is adapted to telescope in length at a middle and/or an end of the horizontal bar.

14. The hoist mechanism of claim 11 wherein the boom pivots between a horizontal (or in use) position and a vertical (or storage) position.

15. The hoist mechanism of claim 11 wherein the boom swings between a outboard (or away from the top of the vehicle) position and a inboard (or over the vehicle) position.

16. The hoist mechanism of claim 11 further comprising a support strut between the boom and the vertical mast.

17. The hoist mechanism of claim 11 further comprising a winch operatively connected to the proximal end of the lift wire.

18. The hoist mechanism of claim 11 wherein the vertical mast extends below insert bar.

19. The hoist mechanism of claim 18 wherein the insert bar is movable along the vertical mast.

20. The hoist mechanism of claim 12 wherein the stubs further include tie-down mechanisms.

* * * * *